US005539852A

United States Patent [19]

Gallagher et al.

[11] Patent Number: 5,539,852

[45] Date of Patent: Jul. 23, 1996

[54] METHOD FOR CONTROLLING SPEED IN A TAPE FEEDING, CUTTING AND EJECTION APPARATUS FOR A MAILING MACHINE

[75] Inventors: Dennis M. Gallagher, Danbury; Thomas M. Pfeifer, Bridgeport; Richard P. Schoonmaker, Wilton, all of Conn.

[73] Assignee: Pitney Bowes Inc., Stamford, Conn.

[21] Appl. No.: 203,459

[22] Filed: Feb. 28, 1994

[51] Int. Cl.[6] .......... H02P 5/17

[52] U.S. Cl. .......... 388/811; 388/815; 388/902; 388/907.5

[58] Field of Search .......... 388/809–815, 388/902, 907.5, 912

[56] References Cited

U.S. PATENT DOCUMENTS

| | | | |
|---|---|---|---|
| 4,513,381 | 4/1985 | Houser et al. | 388/809 X |
| 5,021,781 | 6/1991 | Salazer et al. | 318/561 X |
| 5,167,002 | 11/1992 | Fridhandler | 388/815 |
| 5,225,759 | 7/1993 | Endo et al. | 318/778 |

*Primary Examiner*—David S. Martin
*Attorney, Agent, or Firm*—Steven J. Shapiro; David E. Pitchenik; Melvin J. Scolnick

[57] ABSTRACT

A method for controlling the speed of a motor for a tape drive in a mailing machine includes providing an optical sensor for signaling the appearance of slots in a slotted wheel connected to the motor shaft. The time intervals between slots are used to make a prediction in respect of expected future time intervals and the motor speed is adjusted in accordance with the predicted value to obtain the desired value. For best results, the data is received at the microprocessor using the "capture" mode of operation in order to avoid excessive errors due to a "busy" processor. The invention enables the small motor of a tape drive to avoid over and undershoot even when operating under highly variable load conditions.

2 Claims, 8 Drawing Sheets

METHOD FOR CONTROLLING SPEED IN A TAPE FEEDING, CUTTING AND EJECTION APPARATUS FOR A MAILING MACHINE

FIELD OF THE INVENTION

The invention relates to mailing machines and more particularly tape dispensing units associated with the mailing machines.

BACKGROUND OF THE INVENTION

This application is related to the following five applications concurrently filed and directed to a tape feeding, cutting and ejecting apparatus for a mailing machine: Ser. No. 08,203,132 for Roll-Tape Knife Control for a Tape-Cutting Apparatus in a Mailing Machine; Ser. No. 08/203, 130 for Method for Preventing Jams in a Tape Ejecting Apparatus; Ser. No. 08/203,454 for Method for Initializing a Tape Feeding, Cutting and Ejection Apparatus for a Mailing Machine; Ser. No. 08/203,461 for Method for Control of Length of Imprint for a Mailing Machine; and, Ser. No. 08/203,461 all of which are assigned to the assignee of the instant application.

In addition it is related to the following U.S. Pat. Nos. 5,392,703, 5,390,594, and 5,392,704 all of which are assigned to the assignee of the instant application.

Mailing machines are well known. Generally, mailing machines comprise a postage meter for printing an indicia on a piece of mail or on a tape and a feed base for transporting mailpieces or tapes for printing by the postage meter. Tape feeding mechanisms have typically not been incorporated into small mailing machines because of the costs involved. One of the requirements contributing to these costs is that the speed of the tape being fed must be closely matched to the speed of the postage meter drum which is imprinting on the tape. U.S. Pat. No. 4,584,047 to Vanderpool, et al describes a labelling device which includes a microprocessor control system using feedback information from a timing disk that includes a number of marks which provide signals indicating the actual position of the labels on an associated web of material.

U.S. Pat. Nos. 5,392,703; 5,390,594; and 5,392,704 previously mentioned above, describe a mailing machine in which the conveyor motor for transporting mailpieces is supplied with signals by an optical sensor and slotted wheel for providing count pulses for position location and speed measurement.

In order to reduce costs of the tape unit, it has been found necessary to use a small motor for feeding the tape to the postage meter for imprinting and to avoid the use of expensive encoding mechanisms to determine the actual location and speed of the strip. However, it will be appreciated that at the same time in an application such as the one described herein, a small motor is subjected to extremely variable loads during the course of operation of the tape feeding and cutting operations and it is thus very difficult to control the motor in an open loop operation or as described in the previously cited application to obtain the proper speeds. The use of conventional position encoding is precluded if the objective of lowest possible cost is to be met.

SUMMARY OF THE INVENTION

It is therefore an object of the invention to provide a low cost motor speed control method particularly useful for a small motor subjected to variable loads.

It is another object to provide a method for controlling a motor based on a prediction of speed rather than a current speed in order to avoid over and undershooting of desired speeds because of the variable loads.

These and other objects are attained in a novel method for controlling motor speed of a tape motor drive including a motor having a motor shaft, the method comprising the steps of providing a sensor operatively connected with the motor shaft whose speed is to be measured, detecting with said sensor the occurrence of a signal corresponding to the rate of rotation of the shaft, measuring a time interval between each successive signal, calculating a predicted value of future rotational speed based on the time intervals of current signals, and providing a motor speed correction signal value based on the predicted value for driving the motor.

FIG. *7a* and *7b* comprise a flow chart of the electronic control of the tape-drive motor for maintaining the proper tape speed for printing in the postage meter.

DESCRIPTION OF THE PREFERRED EMBODIMENT

Figure 1:
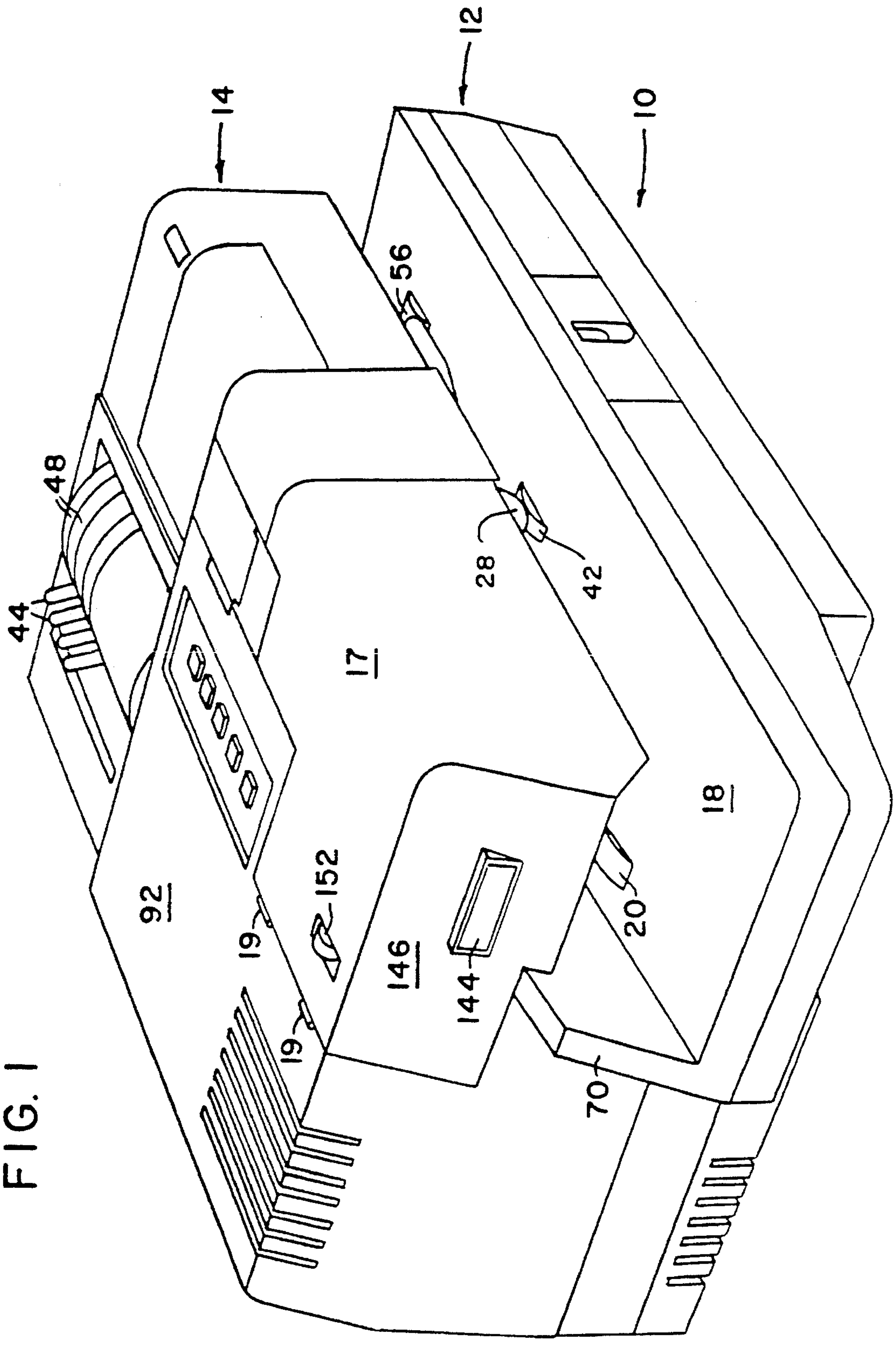
FIG. 1 is a general perspective view of a mailing machine embodying the present invention.
Figure 2:
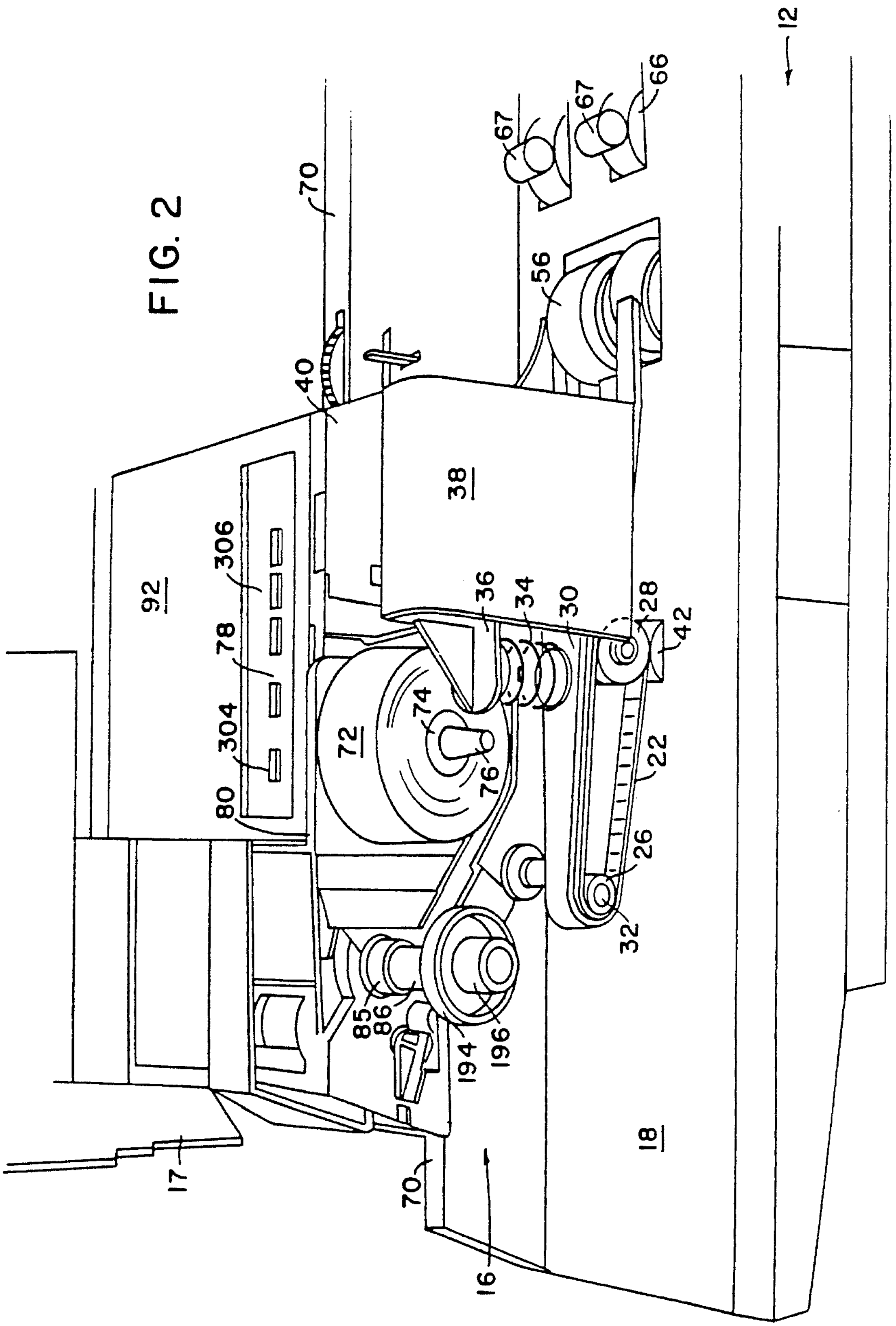
FIG. 2 is a frontal perspective view of the mailing machine shown in FIG. 1 with some covers removed to expose details.

In FIGS. 1 and 2, there is shown generally at 10 a mailing machine as described generally in U.S. Pat. Nos. 5,392,703; 5,390,594; and 5,392,704 each of which is assigned to the assignee of the present invention and specifically incorporated herein by reference.

The mailing machine includes a base shown generally at 12, a postage meter generally designated at 14, and a tape feeding, cutting, and ejection apparatus shown generally at 16 (FIG. 2). The mailing machine preferably includes a housing having a pivoted cover 17 connected by hinges 19 which can be raised to provide access.

The base 12 comprises a feed deck 18 which extends through the mailing machine 10 for support of mailpieces. Feeding rollers 20 project upward through the deck for engaging the underside of the mailpieces while belt 22 which extends around drive pulley 26 and idler pulley 28 serves to engage the upper surface for transporting the mailpiece for feeding to the postage meter. The outer surface of belt 22 passing around idler pulley 28 is mounted on elongate housing 30 which is pivoted about shaft 32 which drives the pulley 26. Housing 30 is spring loaded downwardly by spring 34 on bracket 36 formed on ink cartridge housing 38 which holds a removable ink cartridge 40. Belt 22 engages an idler roller 42 mounted beneath the feed deck 18 which acts as a pressure backup to ensure proper feeding of mailpieces between the belt 22 and idler roller 42.

Figure 3:
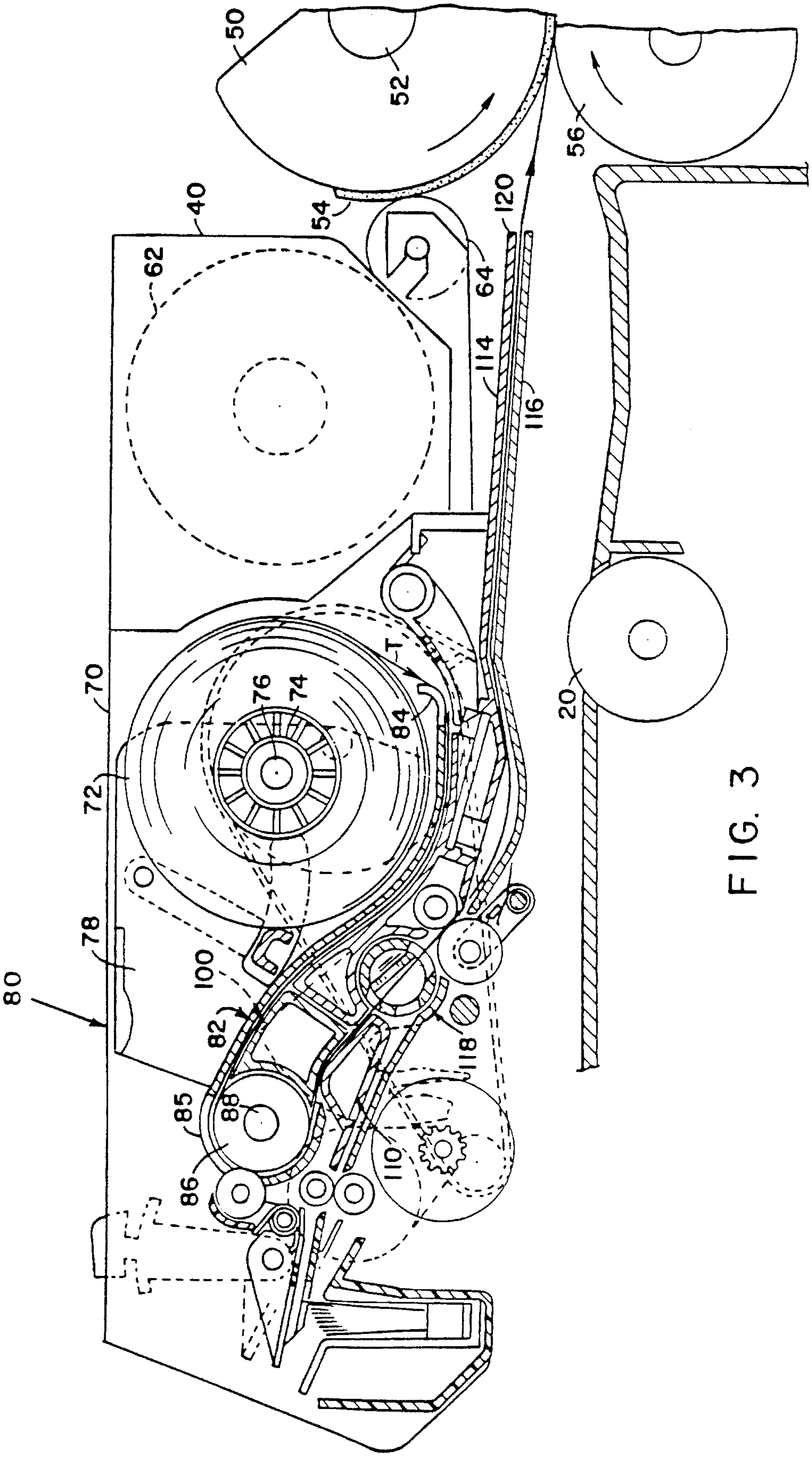
FIG. 3 is a view of the tape feeding, cutting and ejecting apparatus shown in place in the mailing machine.

Postage meter 14 has a plurality of setting levers 44 for setting postage in accordance with numerals on scales 48. As seen in FIG. 3 the postage meter includes print drum 50 mounted on shaft 52 which is driven for rotation of the drum. Drum 50 carries a printing die 54 for printing the indicia on a mailpiece pressed into firm engagement by impression rollers 56. The ink cartridge 40 contacts spring loaded transfer roller 64 for transferring ink to the printing die 54 on each revolution of the printing drum.

Returning to FIG. 2, the base further includes a plurality of eject rollers 66 and cooperating spring loaded pressure rollers 67 for conveying the mailpiece to the end of the feed deck.

Figure 4:
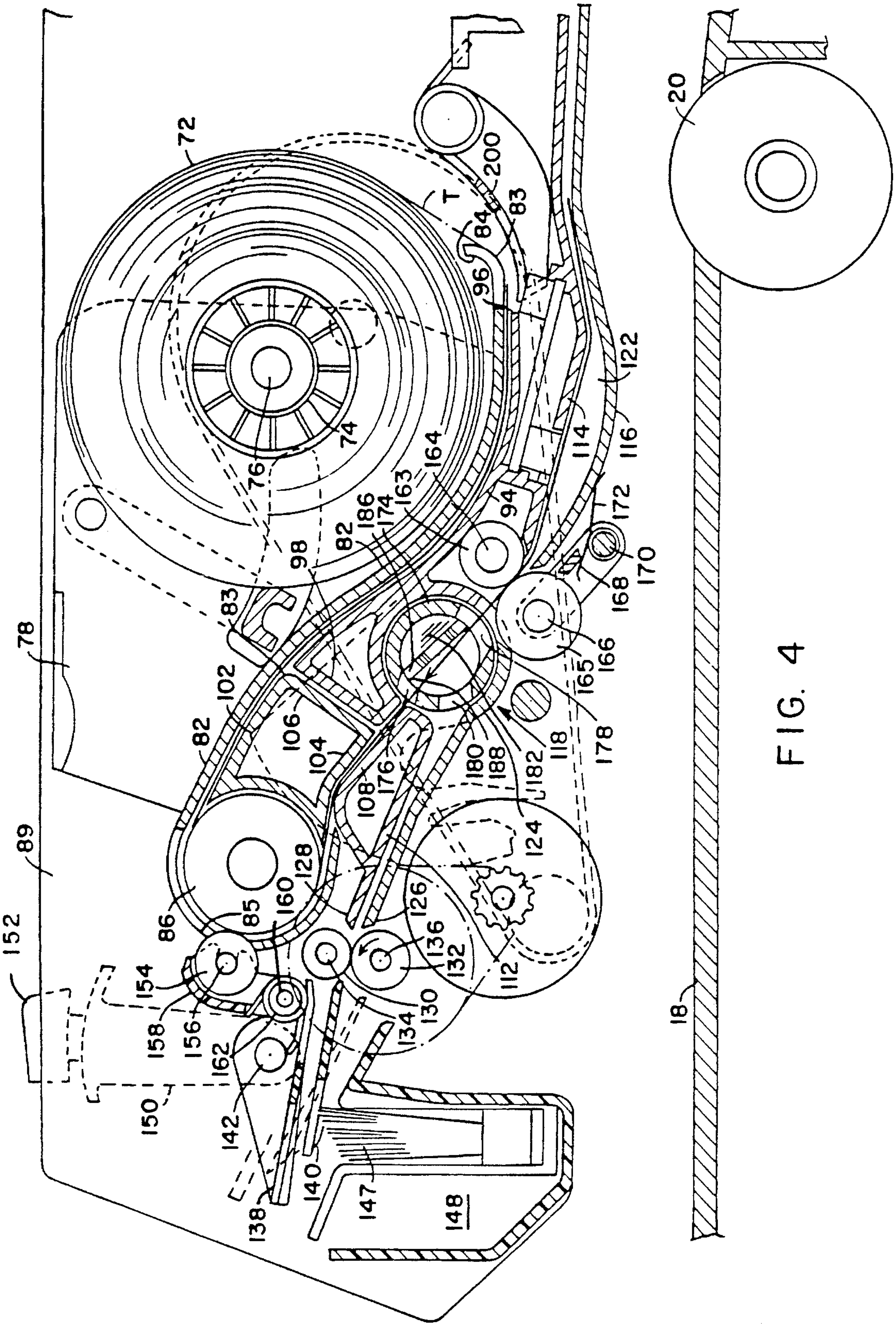
FIG. 4 is a view similar to FIG. 3 but drawn to enlarged scale and partly in longitudinal section to reveal particular details.

Referring now to FIGS. 3 and 4, the base 12 includes a wall 70 (also in FIGS. 1 and 2). The tape feeding, cutting and ejection apparatus 16 is mounted on the wall 70. Apparatus 16 includes a roll of tape 72 suitably mounted on spindle 74 which in turn is mounted on tape holding means which includes stub shaft 76 fixed to an upstanding wall 78 of a movable mounting frame designated generally at 80.

The mounting frame 80 also includes an upper guide plate 82 and has an upturned lip 84 which forms an entrance guide for the strip of tape "T" as it comes off the roll. The upper guide plate terminates in a pair of spaced apart U-shaped portions 85 which fit closely around the outer periphery of a drum shaped tape feed roller 86 fixedly mounted on shaft 88.

As best seen in FIG. 4, the strip is threaded through slot 83 formed formed by the lower surface of the upper guide plate 82 and guide wall 102. The U-shaped portions terminate in a flat portion 87 which is tapered to form a cutting edge 93 against which the free end of tape T is pulled , after it exits through slot 95 defined by edge 93 and guide wall 104. The lower guide plate 94 is disposed contiguously with guide plate 82 over most of its length commencing at end 96 and extending to wall 98.

An upper intermediate guide portion indicated at 100 is arranged in the space between wall 98 and tape feed roller 86 and includes the guide walls 102 and 104 and an upright wall 106 between the walls 102 and 104. The lower guide wall 104 is disposed in close relationship with an upper guide wall 108 of a lower intermediate guide portion designated by 110. This intermediate portion 110 has a lower guide wall 112.

A second set of guide plates 114 and 116 extend generally from a point adjacent a severing mechanism 118 to another point 120 adjacent the nip of the printing drum 50 and the impression roller 56. There is a short span where these guide plates are separated by a substantially larger distance to form a gap 122. The foregoing plates all define a first feed path for the tape.

Another elongate guide plate 124 extends rearwardly from beneath the severing mechanism 118 to an opposite end 126 . The lower guide wall 112 of the intermediate guide portion 110 also has an end 128 located adjacent to the end 126 of the guide plate 124. A pair of feed rollers 130 and 132 are mounted on shafts 134 and 136 respectively.

On the opposite side of the feed rollers 130 and 132 is a tape deflector having closely spaced apart upper and lower guide plates 138 and 140 which are suitably connected together to form an integral unit which is fixedly mounted on on shaft 142. The deflector plates 138 and 140 lead to an outlet opening 144 (FIG. 1) formed in the side wall 146 of the cover. Lever 150 is suitably connected to shaft 142 and terminates upwardly in in a finger button 152 which projects through a top wall 92 to allow the operator to oscillate the shaft 142 back and forth to move the deflector plates 138 and 140 between the solid lines and dotted line position seen in FIG. 4. It will be noted that with the plates in the solid line position, a cut piece of tape is directed under the deflector plate 140 and over the top of the bristles 147 of moistening device 148. If in the dotted position, the deflector plates prevent the tape from being moistened and it is sent directly to the opening 144.

The tape feeding means comprises tape feed roller 86 and idler roller 154 which is rotatably mounted on shaft 156 fixed in frame 158, which in turn is pivotally mounted on shaft 160. Coil spring 162 is wrapped around the shaft 160 so that the ends bear against the frame 158 and the upper surface of deflector plate 138 to urge the frame 158 toward the feed roller 86, and thereby pressing the idler roller 154 into firm engagement with the tape as it passes around the feed roller 86.

Another feed roller 163 is fixedly mounted on a shaft 164 which is rotatably mounted in the frame. A pair of backup idler rollers 165 are mounted on shaft 166 which is rotatably mounted in frame 168 which in turn is pivotally mounted on another shaft 170 which is mounted on the frame walls. Coil spring 172 is mounted on the shaft 170 to urge the idler roller 165 toward the feed roller 163 to provide firm driving engagement between the feed roller 163 and the tape.

It will be appreciated that the feed roller 86 and backup idler roller 158, the feed roller 163 and backup idler roller 165 are all in the first path and serve both to feed the tape and to bring it back to the point where the tape is severed. The set of feed rollers 130 and 132 are disposed in a second path for ejecting the severed piece of tape.

The severing mechanism 118 comprises a cylindrical tubular member 174. This member has a plurality of axially elongate slots through which the tape passes, both in forward and reverse movements. Slot 176 provides an entrance for the tape and a second slot 178 provides an exit. A third slot 180 is formed on the same side as slot 176 to provide an exit for the severed portion of the tape and to direct the tape into the second feed path for ejection of the tape.

A movable cutting member or knife 182 is rotatably mounted in the tubular member 174, the cutting member having a close tolerance fit within the member 174. The knife 182 has a flat surface 186 which is angled slightly and defining a sharpened edge 188 which functions as a moveable blade for cutting the tape when the cutting member 182 is rotated. When the blade moves, it not only severs the tape but depresses the leading edge of the cut piece of tape to the lower slot 180 to direct the cut piece into the second path.

The drive mechanism is implemented suitably with a DC reversing motor (not seen in these figures) as described in connection with applications Ser. No. 180,161 and Ser. No. 180,168 for Tape Feeding, Cutting and Ejecting Apparatus for a Mailing Machine, previously incorporated by reference herein. The result of the operation is that a tape is fed to the postage meter for imprinting along a first path and then the tape is reversed and the appropriate strip length is severed and the severed tape strip is ejected along the second path. The complete operation is described in this referenced application and will not be further described herein except as required for the discussion of the present invention.

Figure 5:
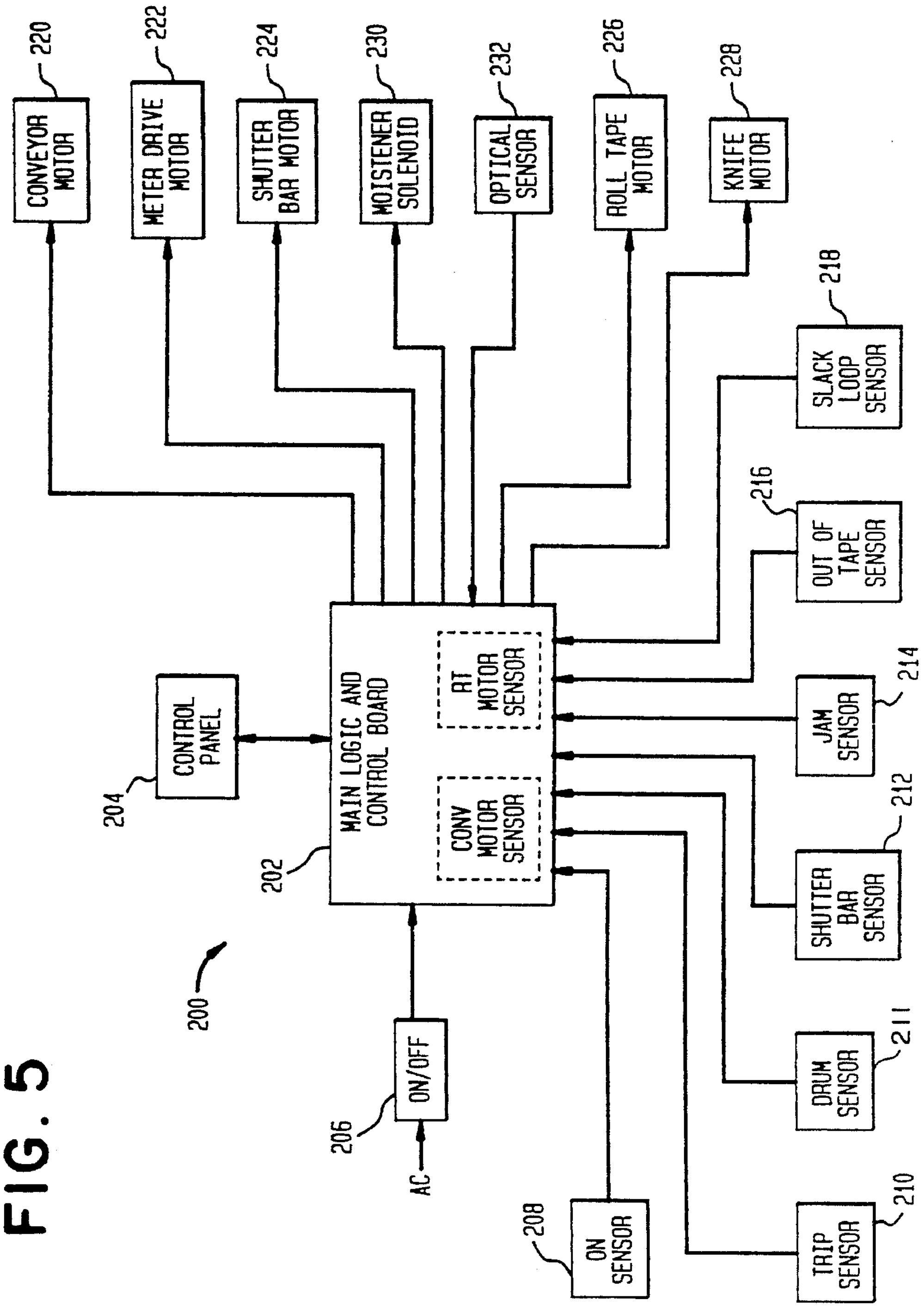
FIG. 5 is a schematic block diagram of the electronic components of the mailing machine.

FIG. 5 is a circuit block diagram of the mailing machine. As seen generally at 200, the main logic and control board 202 receives information from a control panel 204 when A/C power has been applied via on/off switch 206. Various sensors, such as those illustrated for determining the ON condition, 208; trip sensor, 210; drum sensor, 211; shutter bar sensor, 212; jam sensor, 214; out-of-tape sensor, 216; and slack loop sensor, 218 provide information to the control board 202 about the state of the machine while the board outputs information for driving the various motors and solenoids. These motors are the conveyor motor, 220; the meter drive motor, 222; the shutter bar motor, 224; the roll tape drive motor, 226; and the knife motor, 228. The board also provides control information to the moistener solenoid 230 and receives optical count data indicated here at block 232 from an optical sensor and slotted rotating disc operatively connected to the roll tape motor.

Figure 6:
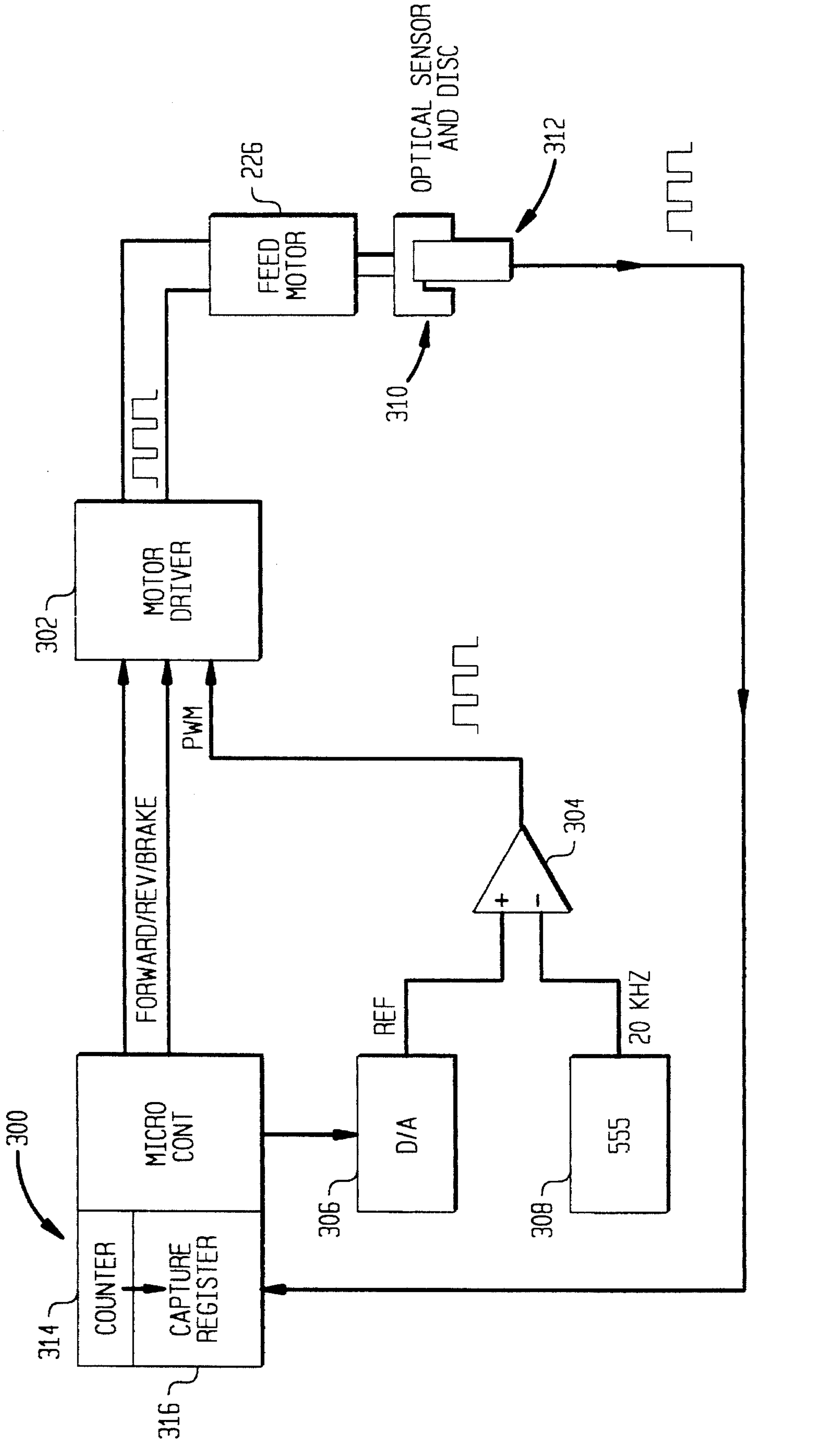
FIG. 6 is a schematic block diagram of the apparatus for motor speed control in accordance with the invention.

FIG. 6 is a schematic diagram of an embodiment of a speed control circuit arrangement in accordance with the invention. The circuit provides bi-directional speed control and tape position information. Microprocessor controller 300 feeds control information to motor driver 302 for operating roll tape drive motor 226. The speed of the motor is preferably controlled by varying the duty cycle of the motor voltage, suitably, for example by means of operational amplifier 304 outputs derived from D/A converter 306 providing input along with 20 kHz input 308. Optical sensor 310 senses transitions of a rotating slotted disc indicated at 312 for providing signal pulses to the micro controller at a rate corresponding to the rotational rate of the motor shaft.

For best results, the speed pulses are measured by configuring the micro controller's internal timer in the so-called "capture" mode. In this mode, each occurrence of the sensor signal causes the current value of an internal counter 314 to be stored in the capture register shown at 316. In this mode an interrupt flag is set to indicate that a number has been stored.

Figure 7A:
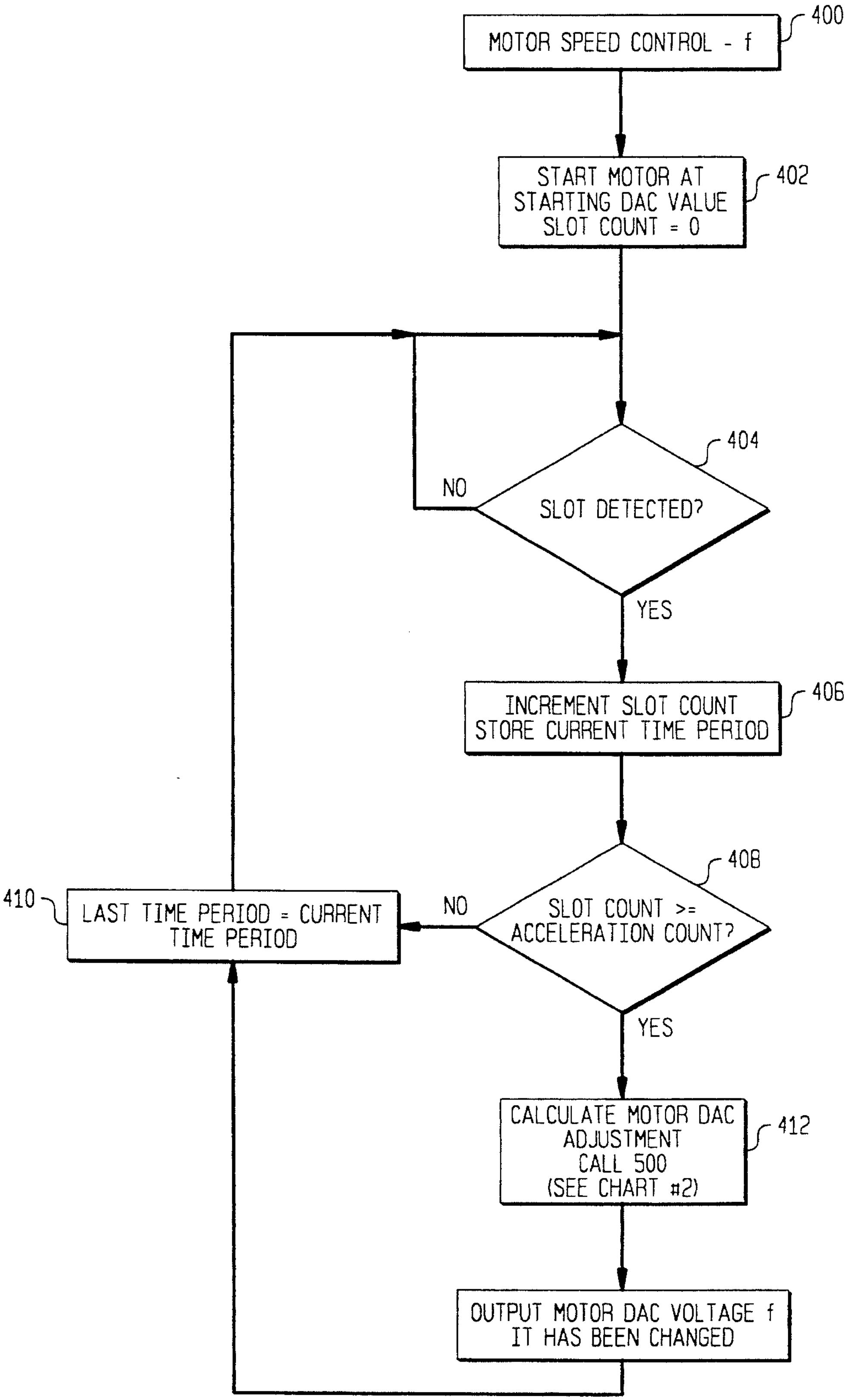
Figure 7B:
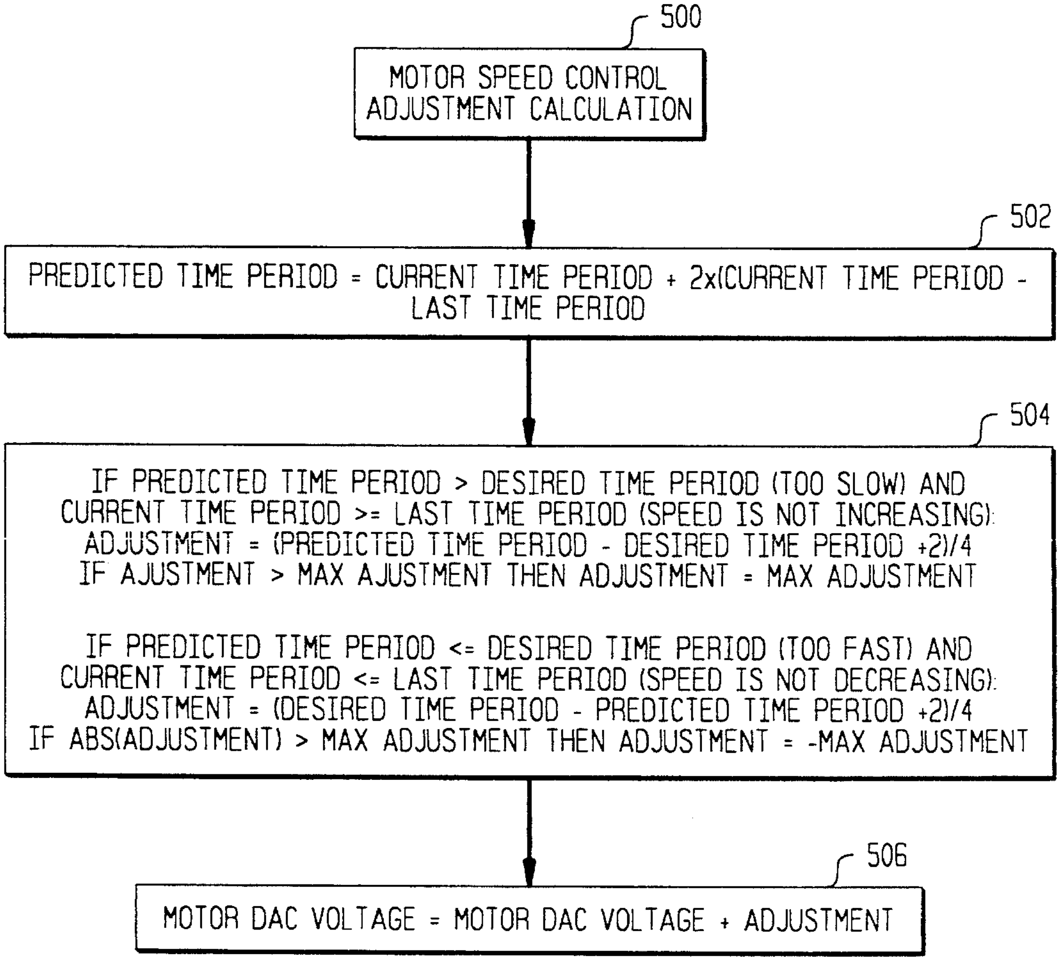

FIG. 7a and 7b comprise a flow chart of the implementation of motor speed control of the roll tape motor. As shown in FIG. 7a at 400, the motor speed control routine starts the motor, block 402, at a predetermined starting DAC value with the slot count at 0. The slot detection is checked, block 404, and the program loops until the slot is detected. When it is detected, the YES branch falls to increment the slot count and stores the current time period, block 406. Preferably, time in this embodiment is measured in counter "ticks", each tick being about 3.2 microseconds. For best results, the counter value is captured in the capture register on the occurrence of the sensor transition and is not part of the software routine here illustrated as brought out above. It will be understood that it may, if desired, be part of the routine, however it is believed that in the method described here, there is increased accuracy since any delay of the micro in response to the interrupt signal is not included in the measurement. In many cases the delay may be unacceptable.

In a preferred embodiment, the slot count is then checked to see if it is greater than or equal to a predetermined acceleration count, block 408. This means, for instance, that the DAC voltage is not adjusted for the first slots, for example, 60 slots or about 2-inches of tape, so that the motor speed can stabilize. Until the slot count reaches the predetermined acceleration count, the last time period is set equal to the current time period, block 410 and the program loops back. If the acceleration count is reached or has past, the YES branch falls to block 412 and the DAC adjustment routine 500 is called. It will be understood that other acceleration counts may be used as desired.

In the preferred embodiment, the adjustment routine uses the two most recent speed measurements to predict what the motor speed is going to be two measurements later in order to offset the large fluctuations in load seen by the motor. In order to make the adjustment, the calculations are based on the parameters for the machine described here which are that 16 counter ticks represent approximately 1-inch/second in tape speed and 4 D/A counts change the tape speed by approximately 1 inch/second. It will be appreciated that in this case, for every 4 ticks in predicted speed error there is required 1 D/A count adjustment.

The adjustment is preferably derived by linearly projecting the change in speed from the previous measurement to two measurements ahead. Thus at block 502, the predicted time period is calculated as being equal to the current time period plus 2 times the difference in the current time period and the last time period. At block 504 the calculations are made based on the comparison of the predicted time period to desired time period and the motor DAC voltage is set at block 506 and the program returns to the speed control routine where, at block 414, the new DAC voltage is output and the program loops back to block 410 where current time period is set to be the last time period, and the routine loops or returns to other operations as required.

The following is offered as an example and not as a limitation:

Desired measurement for correct speed=438

Previous measurement=442

Current measurement=446

Two measurements from now=446+4+4=454

Predicted speed error=454–438=16 ticks

Adjustment=16/4=4 D/A counts (increases tape speed about 1 inch/sec)

It will be appreciated that other tick and D/A count values may be chosen in correspondence with the desired application. It will also be understood that, if desired, the projected rates of speed can be based on algorithms other than a linear projection. The invention is not limited to projections of two measurements forward and other measurement intervals are also contemplated within the scope of this invention.

What is claimed is:

1. A method for controlling motor speed of a tape motor drive including a motor having a motor shaft, the motor operatively in communication with a microcontroller which generates a digital output signal for use in rotating the motor shaft at a motor shaft speed, the method comprising the steps of:

a) detecting each time the motor shaft is in a predetermined position during rotation thereof;

b) generating a signal indicative of each time the motor shaft is being detected as being in the predetermined position, at least first, second and third successive signals being generated;

c) determining a first time interval between the first and second successively generated signals and a second time interval between the second and third successively generated signals;

d) calculating a future predicted time interval between two future successive signals based upon the first and second time intervals;

e) comparing the future predicted time interval to a desired future time interval to determine a difference therebetween; and f) generating, via the microcontroller, an adjustment to the digital output signal, the adjusted digital output signal changing the motor shaft speed such that the two future successive signals are separated by the desired future time interval, and at times when the future predicted time interval is greater than the desired future time interval and the second time interval is greater than the first time interval the adjusted digital output signal increases the motor shaft speed.

2. A method as set forth in claim 1, further including the step wherein at times when the future predicted time interval is less than the desired future time interval and the second time interval is less than the first time interval, the adjusted digital output signal increases the motor shaft speed.

* * * * *